No. 714,496. Patented Nov. 25, 1902.
A. C. LINDGREN.
CHANGEABLE SPEED GEAR.
(Application filed Nov. 14, 1901.)
(No Model.) 2 Sheets—Sheet 1.

Witnesses
Inventor
A. C. Lindgren
B. P. T. Dodge, Attorney

No. 714,496. Patented Nov. 25, 1902.
A. C. LINDGREN.
CHANGEABLE SPEED GEAR.
(Application filed Nov. 14, 1901.)
(No Model.)
2 Sheets—Sheet 2.
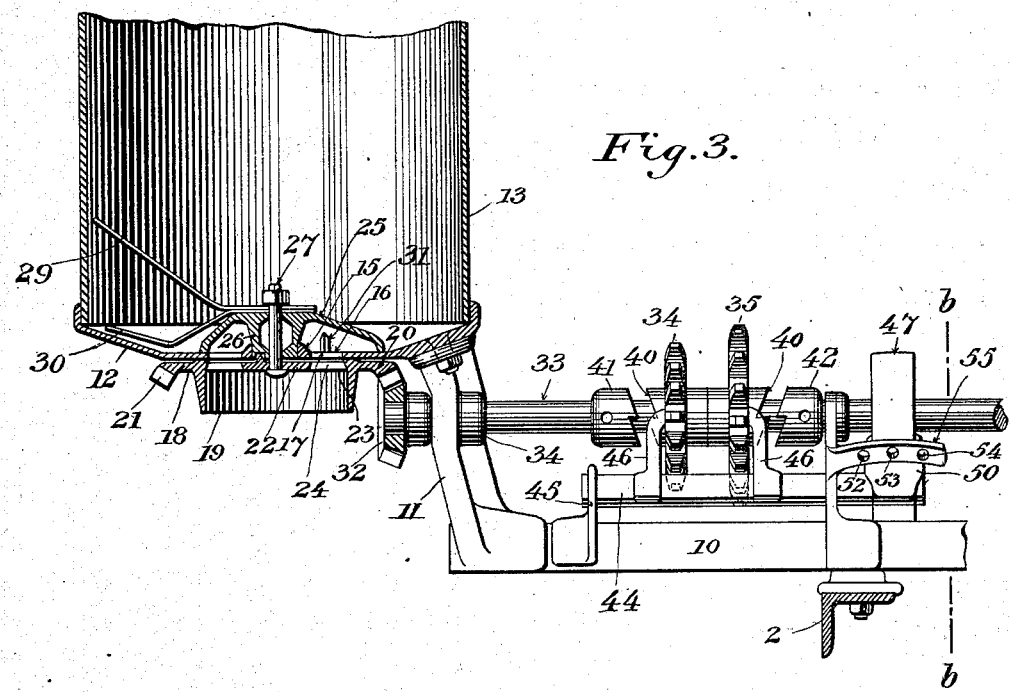
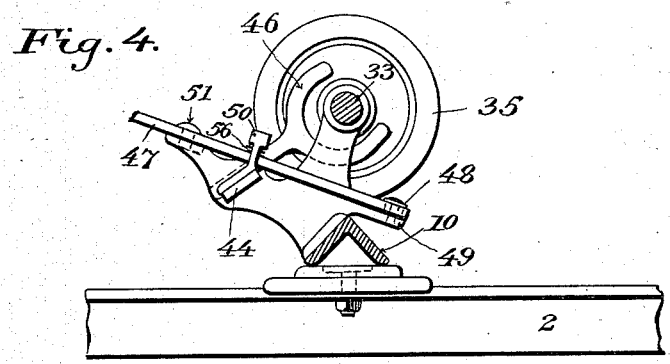
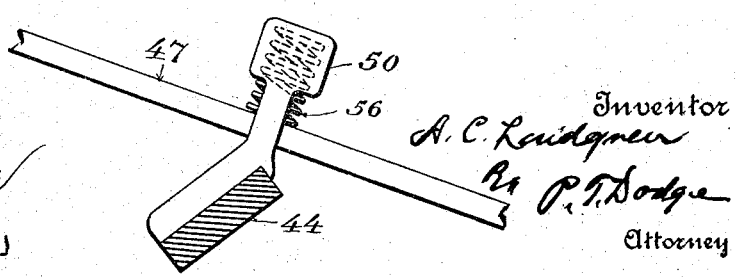

UNITED STATES PATENT OFFICE.

ALEXUS C. LINDGREN, OF MOLINE, ILLINOIS, ASSIGNOR TO THE MOLINE PLOW COMPANY, A CORPORATION OF ILLINOIS.

CHANGEABLE-SPEED GEAR.

SPECIFICATION forming part of Letters Patent No. 714,496, dated November 25, 1902.

Application filed November 14, 1901. Serial No. 82,277. (No model.)

*To all whom it may concern:*

Be it known that I, ALEXUS C. LINDGREN, of Moline, county of Rock Island, and State of Illinois, have invented a new and useful Improvement in Changeable-Speed Gear, of which the following is a specification.

This invention relates to that type of driving-gear in which provision is made for changing the speed of the driven shaft; and the invention consists of the combination, with a driving member, of a driven shaft and improved means under the control of the operator for varying the speed of the driven shaft at will, which improved means are set forth in the specification and defined in the claims.

The invention is designed more particularly for application to a fertilizer-distributing attachment for seeding-machines, the purpose being to provide for varying the rate of discharge of the fertilizer at will to meet the different conditions of the soil, as it frequently happens that certain parts of the field are richer than others, so that a smaller amount of fertilizer is required at these points. It will be understood, however, that my improved construction is applicable as well to other mechanisms and wherever it is desired to vary the speed of the driven parts.

Figure 1:
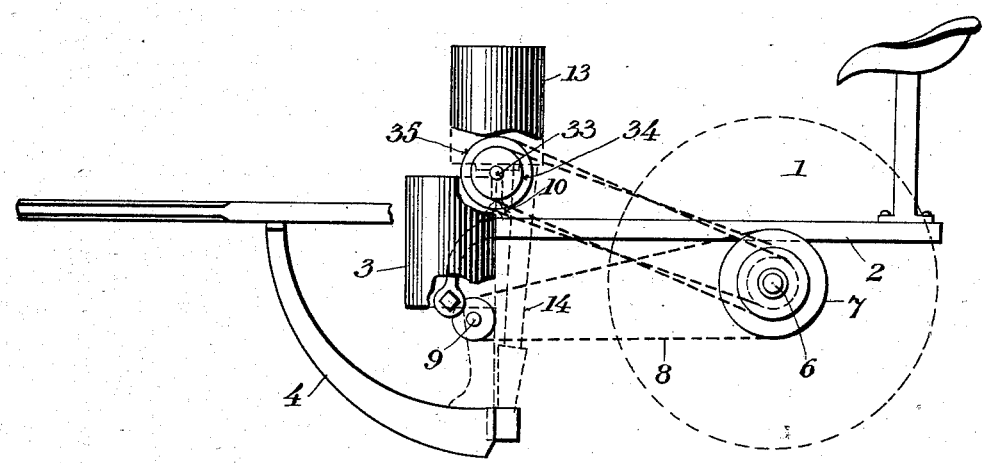
Figure 2:
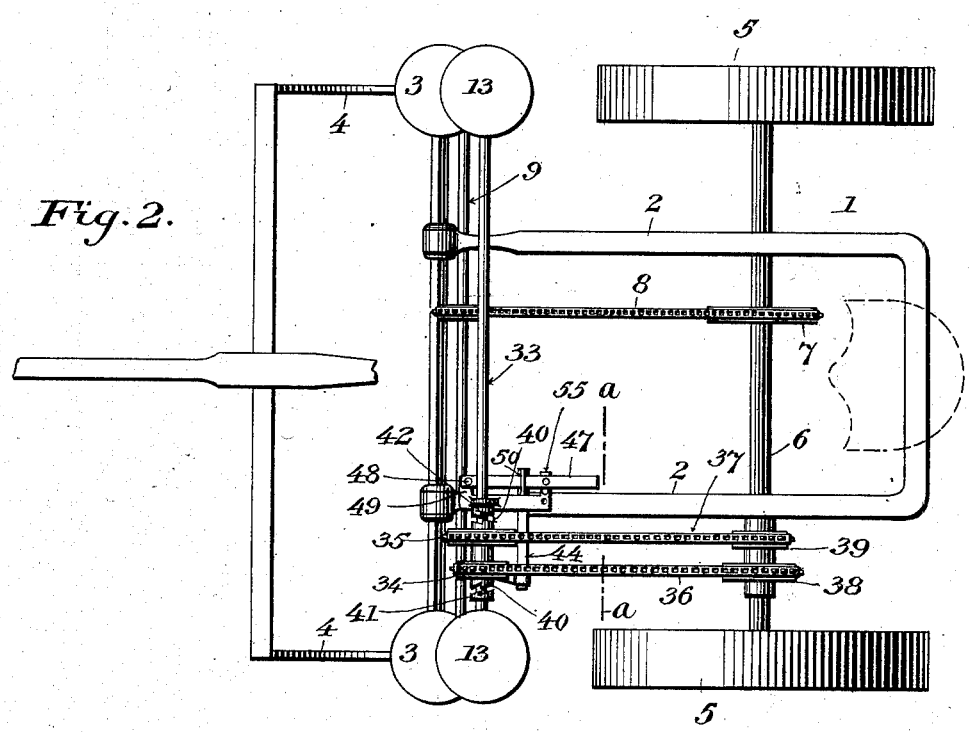

In the accompanying drawings, Figure 1 is a side elevation of a seeding-machine having my invention embodied therein. Fig. 2 is a top plan view of the same. Fig. 3 is a transverse sectional elevation on the line *a a* of Fig. 2. Fig. 4 is a vertical sectional elevation on the line *b b* of Fig. 3. Fig. 5 is a sectional elevation, on an enlarged scale, of the locking device for the clutch-lever.

Referring to the drawings, 1 represents the wheel-frame of a seeding-machine, comprising two horizontal parallel fore-and-aft bars 2, connected at their ends and constituting a rectangular frame. At its front this frame gives support to two seed-hoppers 3, provided with suitable seed-discharging mechanisms, (not shown,) which deliver into vertical tubes or conduits communicating at their lower ends with runners or shoes 4. At its rear end the rectangular frame is sustained by ground-wheels 5, mounted on the ends of a horizontal transverse shaft or axle 6, journaled on the rectangular frame and provided with a sprocket-wheel 7, connected by a sprocket-chain 8 with a sprocket-wheel on a drive-shaft 9, mounted in the forward end of the frame and operatively connected with the seeding mechanisms in the hoppers.

To the upper side of the rectangular frame, near its forward end, is fixed a horizontal bar 10, extending transversely across the frame and formed on its ends with upwardly-extending bracket-arms 11, sustaining hoppers or receptacles 13, in which the fertilizer is placed and from which it is distributed by rotary distributing mechanisms provided with gear-teeth 21, engaged by beveled gears 32, mounted on the ends of a horizontal shaft 33, journaled in bearings 34 in the bracket-arms 11 before alluded to.

The shaft 33 is adapted to be driven at different rates of speed to vary the amount of fertilizer discharged according to the nature of the soil as regards its richness, and I accomplish this change in speed by a mechanism of improved form now to be described.

On reference to Fig. 1 it will be seen that the shaft 33 is provided with two sprocket-wheels 34 and 35, the wheel 34 being smaller in diameter than its companion wheel. These wheels are mounted loosely on the shaft and are driven, by means of chains 36 and 37, from two sprocket-wheels 38 and 39 on the main drive shaft or axle 6 of the machine, the wheel 38 being greater in diameter than the other one. As a result of this arrangement the wheel 34 on shaft 33 will be driven at a high rate of speed with reference to the wheel 35. The hubs of these two wheels 34 and 35 are provided on their outer sides with teeth 40, which by the movement of the wheels along the shaft are adapted to be engaged alternately with clutch-blocks 41 and 42, fixed to the shaft. The two wheels are moved along the shaft, and thus engaged with the respective clutch-blocks, by means of a slide 44, mounted beneath the wheels in guides 45 and provided with vertical forked arms 46, bearing, respectively, against the outer faces of the wheels. The slide is shifted back and forth in its guides by means of a hand-lever 47, pivoted, as at 48, to a fixed bracket-arm 49 and extending through a yoke 50, fixed to the slide 44, a pin 51 being fixed to the lever and adapted to be inserted in holes 52, 53, and 54 in an arm 55, projecting laterally from the bracket-arm 49. This lever is capable of a slight vertical movement within the yoke, so that the pin may be disengaged from the holes in the arm 55, and it is held downward yieldingly to hold the parts locked by means of a spring 56, seated in the yoke and bearing on the top of the lever.

In the operation of the device when the lever is shifted to the left and its pin engaged in hole 52 the small sprocket-wheel 34 will be engaged with clutch-block 41 and the distributer will be driven at a high rate of speed. When shifted to the other side, with the wheel 35 engaging clutch-block 42, the distributer will be driven at a reduced speed, and when the lever is adjusted to a medial position, with its pin engaging in the central hole in the arm 55, both sprocket-wheels will be out of engagement with the clutch-blocks and will rotate loosely on the shaft 33, so that the fertilizer-distributing mechanism will remain at rest.

Having thus described my invention, what I claim is—

1. In combination with the frame, a driven shaft mounted in bearings therein, two wheels mounted loosely on the shaft and slidable along the same, means for clutching said wheels respectively to the shaft, a horizontal slide, arms fixed to the slide and engaging said wheels, an operating-lever pivoted to the frame, a yoke fixed to the slide and embracing the lever, a spring in the yoke and bearing on the lever, a horizontal arm on the frame provided with holes, and a pin on the lever adapted to be engaged in said holes to hold the lever in position.

2. In combination with the frame, a driving-shaft mounted therein and adapted to receive a constant rotation as the frame advances, two sprocket-wheels fixed on said shaft and receiving continuous motion therefrom, a driven shaft mounted in the frame, mechanism adapted to be operated by said driven shaft at different speeds, two sprocket-wheels differing in diameter mounted loosely on the driven shaft and slidable longitudinally therealong, clutch-teeth on the outer sides of the wheels, clutch-blocks fixed to the driven shaft on the opposite sides of the slidable wheels, a horizontal slide 44 mounted on the frame parallel with the axis of the driven shaft, two arms extending from said slide and bearing respectively at the outer sides of the two wheels, and a hand-lever pivoted to the frame and engaging the said slide and adapted when shifted on its axis to reciprocate the slide and effect the connection and disconnection of the two wheels with their respective clutch-block.

In testimony whereof I hereunto set my hand, this 18th day of September, 1901, in the presence of two attesting witnesses.

ALEXUS C. LINDGREN.

Witnesses:
THEO. STARKS,
JNO. J. ROSS.